United States Patent
Izawa et al.

(10) Patent No.: US 6,223,108 B1
(45) Date of Patent: Apr. 24, 2001

(54) TIRE CONTACT LOAD CONTROL SYSTEM (75) Inventors: Masaki Izawa; Kei Oshida; Hideaki Shibue, all of Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/083,717

(22) Filed: May 22, 1998

Related U.S. Application Data (63) Continuation-in-part of application No. 09/040,081, filed on Mar. 17, 1998, and a continuation-in-part of application No. 09/047,008, filed on Mar. 24, 1998.

(30) Foreign Application Priority Data

May 22, 1997 (JP) .................................................. 9-131805

(51) Int. Cl.[7] .......................... B60G 21/00; B60G 17/015; B60G 17/06
(52) U.S. Cl. ........................ 701/36; 280/5.513; 280/5.504
(58) Field of Search ............................. 701/36, 37, 38, 701/48, 69, 70, 71, 72, 73, 80, 89; 280/5.513, 5.512, 5.518, 5.504, 5.507, 124.157

(56) References Cited

U.S. PATENT DOCUMENTS

| | | |
|---|---|---|
| 4,625,993 | 12/1986 | Williams et al. .................. 280/5.507 |
| 4,729,580 * | 3/1988 | Buma et al. .......................... 280/707 |
| 5,297,646 * | 3/1994 | Yamamura et al. .................. 180/142 |
| 5,322,319 * | 6/1994 | Tanaka et al. ........................ 280/707 |
| 5,590,898 * | 1/1997 | Williams et al. ..................... 280/707 |
| 5,718,446 * | 2/1998 | Fuchida ................................ 280/703 |
| 5,892,139 * | 4/1999 | Miyazaki ................................... 73/9 |
| 5,927,426 * | 7/1999 | Hall et al. ............................ 180/249 |

* cited by examiner

Primary Examiner—Tan Nguyen
Assistant Examiner—Dalena Tran
(74) Attorney, Agent, or Firm—Carrier, Blackman & Associates, P.C.; Joseph P. Carrier; William D. Blackman (57) ABSTRACT An active actuator is interposed between the unsprung mass and the sprung mass of a vehicle, and a controller selectively extends and retracts the actuator at a prescribed acceleration so as to selectively apply an additional contact load to the wheel by making use of the inertial force of the sprung mass and/or the unsprung mass of the vehicle. A particularly advantageous result can be achieved by increasing the tire contact load when the wheel is about to lock up when braking. The present invention can thus reduce the braking distance for the given road condition.

7 Claims, 5 Drawing Sheets

TIRE CONTACT LOAD CONTROL SYSTEM

CROSS REFERENCE TO RELATED APPLICATION

This is a continuation-in-part application of copending patent applications Ser. No. 09/040,081 filed Mar. 17, 1998 and Ser. No. 09/047,008 filed Mar. 24, 1998. Also, the contents of another copending application Ser. No. 09/083,718 of even date are hereby incorporated in this application by reference.

TECHNICAL FIELD

The present invention relates to a tire contact load control system for increasing the road wheel contact pressure on the road surface as needed by actuating an actuator interposed between the sprung mass and the unsprung mass of the vehicle at a certain acceleration.

BACKGROUND OF THE INVENTION

The gripping force F of a tire can be given by the product of the frictional coefficient $\mu$ between the tire and the road surface and the vertical contact load W acting on the tire contact surface ($F=\mu W$). In other words, the tire gripping force which plays an important role in the handling of the vehicle is proportional to the magnitude of the tire contact load for a given road condition.

It is well known that the handling of a vehicle is severely impaired when a road wheel thereof is locked up when braking. In particular, on a road surface such as a frozen road surface and a gravel road surface which could significantly reduce the gripping force of the tire, it is important to apply as large a braking force to the wheel as possible, but, without locking the wheel. The antilock brake system (ABS) makes use of this principle, and is widely used in road vehicles now on the market. According to this system, by noting the relationship between the tire slip ratio ($\lambda=(V_v-V_w)/V_v$: the ratio of the difference between the vehicle speed $V_v$ and the tire speed $V_w$ to the vehicle speed $V_v$) and the tire grip force F, the slip ratio is kept within a limit typically by intermittently releasing the brake so as to avoid excessive slipping and to provide a high gripping force at all times. However, the ABS system is not able to change the gripping force of the tire. In other words, the capability of the ABS system to reduce the braking distance of the vehicle is limited by the given road gripping force. It is therefore desirable if the gripping force itself can be increased in view of further reducing the braking distance.

The road gripping force of a tire is important also when accelerating a vehicle. When a vehicle is excessively accelerated for a given road condition, the tires start slipping, and not only a desired acceleration is prevented from being achieved, but also the lateral stability of the vehicle may be lost. By noting this problem, it has been proposed to control the traction force of each driven wheel so that the slip ratio of the wheel may be kept within a limit, and a maximum available traction may be obtained at all times. The traction control system is designed to carry out such a control action. However, the conventional traction control system was not able to increase the magnitude of the available traction, and simply reduces the torque transmitted to the wheels so as to prevent the slip ratio from exceeding a prescribed limit.

When a linear actuator interposed between a wheel and a vehicle body is either extended or retracted at a certain acceleration, a corresponding inertia force is produced in the sprung mass and the unsprung mass. The reaction of such an inertia force may be used to increase the contact load of the road wheel or the gripping force of the tire. Therefore, when this concept is applied to a brake control system or a traction control system, it is possible to reduce the braking distance or to increase the magnitude of the available traction. In particular, the inventors have recognized that an optimum result can be achieved if the contact load of the wheel is increased when the slip ratio of the wheel is about to exceed a threshold level beyond which the tire grip force starts diminishing.

BRIEF SUMMARY OF THE INVENTION

In view of such problems of the prior art and the recognition by the inventors, a primary object of the present invention is to provide a vehicle tire contact load control system which can selectively increase the tire contact load of a road wheel.

A second object of the present invention is to provide a vehicle tire contact load control system which can increase the gripping force of a road wheel for a given road condition.

A third object of the present invention is to provide a vehicle tire contact load control system which can maximize the braking or the traction force of a vehicle on a given road surface.

A fourth object of the present invention is to provide a vehicle tire contact load control system which can allow a vehicle to accelerate or decelerating on a low-$\mu$ road surface in a stable manner.

According to the present invention, such objects can be accomplished by providing a vehicle tire contact load control system, comprising: a wheel suspension system for supporting an unsprung mass including a wheel to a sprung mass including a vehicle body; an active actuator interposed between the unsprung mass and the sprung mass; means for computing a slip ratio of a wheel; and a controller for extending the actuator at a prescribed acceleration so as to selectively apply an additional contact load to the wheel when a slip ratio computed by the computing means has exceeded a prescribed value. The extended actuator may be retracted at such a time when the tire contact load is not so critical.

Thus, the tire grip force can be increased for the given road condition, and the braking force or the traction force available to the wheel can be increased. The prescribed value may be selected at a level which is preferably below the level from which the tire grip force starts diminishing. In particular, it is preferable to select the prescribed value at the level at which the tire grip force takes a maximum value. In case of a tire contact load control during braking in a vehicle equipped with an antilock brake system, it is preferable to set the prescribed value lower than the reference value at which the antilock brake system is activated. Thus, the additional brake force which is made available by increasing the tire contact load can be fully utilized, and the antilock brake system can take over the brake control only after the maximum braking force has been used so that the overall braking distance may be minimized.

Because the road condition could significantly change the tire grip force available to the tire, it is preferable to determine the road condition, for instance by analyzing the tire noise or the road noise, and to properly estimate the critical slip ratio at which the contract load control should be started for an optimum result.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
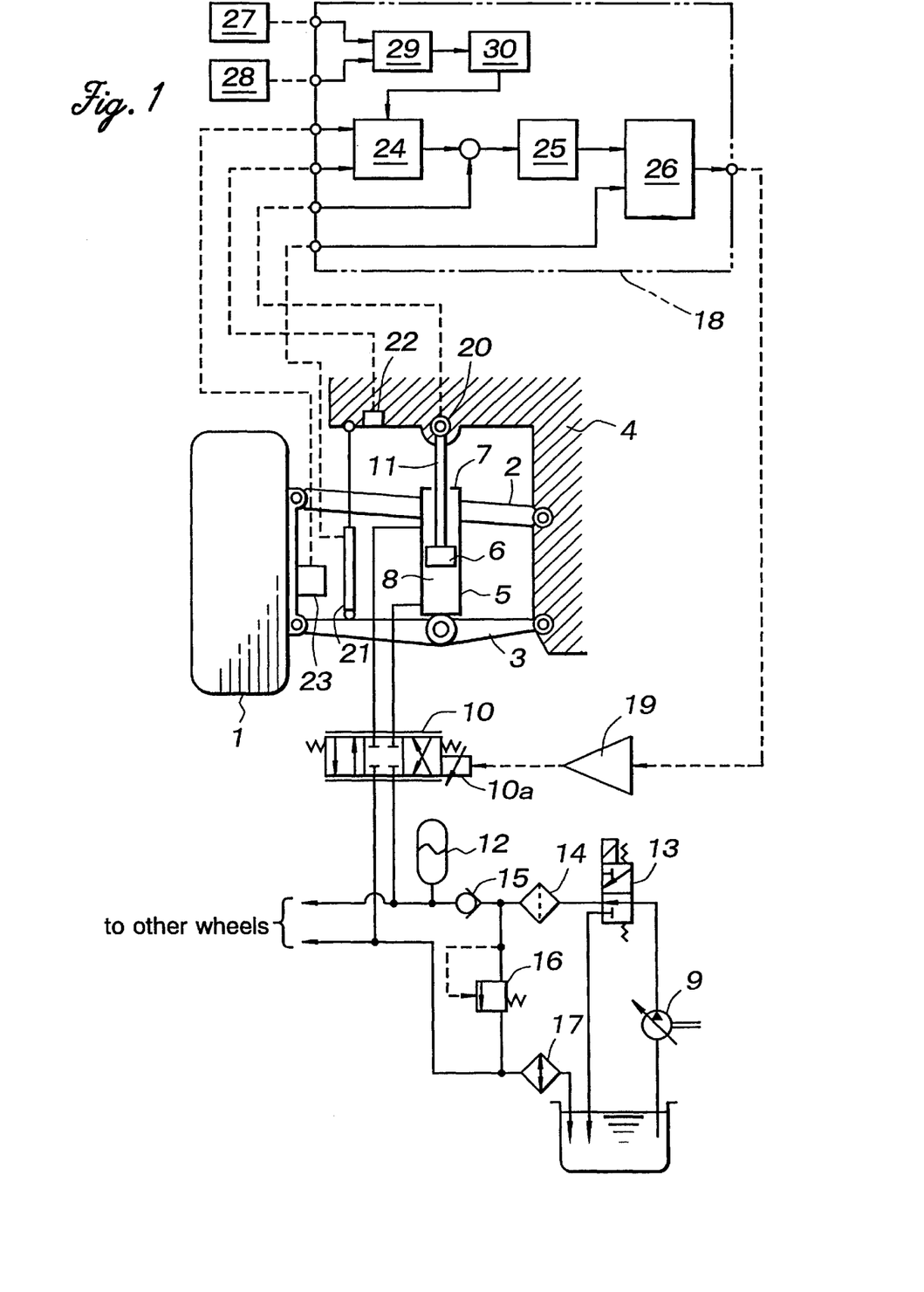
FIG. 1 is a schematic diagram showing a preferred embodiment of the vehicle tire contact load control system according to the present invention.

FIG. 1 schematically illustrates an essential part of an active wheel suspension system to which the present invention has been applied. A tire wheel 1 is supported by upper and lower suspension arms 2 and 3 so as to be moveable vertically with respect to a vehicle body 4. A linear actuator 5 consisting of a hydraulic cylinder is connected between the lower suspension arm 3 and the vehicle body 4. The linear actuator 5 includes a piston 6 received in a cylinder defining an upper oil chamber 7 and a lower oil chamber 8, and a thrust force is produced in a piston rod 11 by controlling the hydraulic pressures transmitted from a variable capacity oil pump 9 to these oil chambers 7 and 8 via a servo valve 10. Thereby, the relative distance between the center (axle) of the wheel 1 and the vehicle body 4 can be controlled at will.

The oil delivered from the pump 9 is initially stored in an accumulator 12 to remove the pulsating ripples in the oil pressure, and avoid shortage of the oil flow during a transient process. The pressure is then transmitted to each of the wheels 1 via the corresponding servo valve 10. This oil circuit further comprises an unloading valve 13, an oil filter 14, a check valve 15, an oil pressure regulating valve 16, and an oil cooler 17, but these components are conventional and are therefore not described here in any great detail.

The servo valve 10 controls the magnitude and direction of the hydraulic pressure applied to the hydraulic actuator 5 in a continuous manner according to a control signal supplied from an electronic control unit (ECU) 18 to a solenoid 10a of the servo valve 10 via a servo valve driver 19. The ECU 18 produces the control signal by processing output signals from a load sensor 20 interposed between the vehicle body 4 and the piston rod 11, a stroke sensor 21 interposed between the vehicle body 4 and the lower suspension arm 3, a sprung mass acceleration sensor 22 for detecting the vertical acceleration of the vehicle body 4, and an unsprung mass acceleration sensor 23 for detecting the vertical acceleration of each wheel 1 according to a control algorithm illustrated in FIG. 2.

Figure 2:
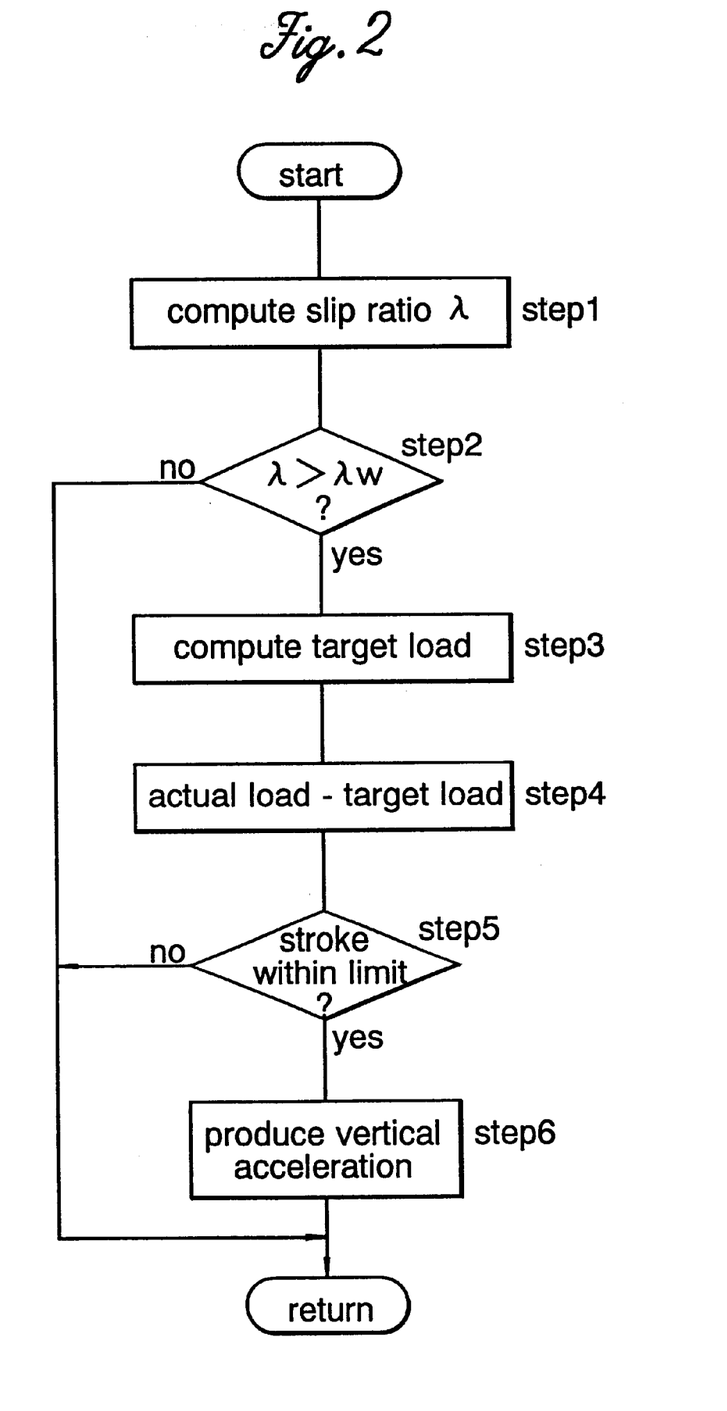
FIG. 2 is a control flow chart of the control unit of the system illustrated in FIG. 1.

The output signals from a vehicle speed sensor 27 and a wheel speed sensor 28 are supplied to a slip ratio computing unit 29 to compute the slip ratio $\lambda$ when braking (step 1). A map 30 (FIG. 3) defining a relationship between the grip force F and the slip ratio $\lambda$ is looked up to determine if the slip ratio has reached a prescribed reference value $\lambda_w$ at which the grip force F takes a maximum value (step 2). In other words, the grip force starts diminishing once the slip ratio exceeds this reference value $\lambda_w$. This allows the determination if the tire is about to be locked up or not. If any particular tire is determined to be about to lock up, a target load computing unit 24 internally defines a target load while referring to the output signals of the sprung mass acceleration sensor 22 and the unsprung mass acceleration sensor 23 (step 3). A stabilizing computing unit 25 then computes a deviation between the actual tire load obtained from the load sensor and the internally defined target tire load (step 4), and processes the deviation to produce a command signal for the servo valve driver 19 in cooperation with a stroke limit computing unit 26 which adjusts the command signal so as to keep the stroke of the actuator 5 within a limit (step 5). The adjusted command signal drives the servo valve 10 to produce a prescribed stroke from the actuator 5, and produces a vertical acceleration in at least one of the sprung mass and the unsprung mass so as to increase the tire contact load (step 6). As a result, the tire grip force is temporarily increased as shown in FIG. 4, and the limit of locking up the wheel is raised so as to reduce the braking distance.

Figure 4:
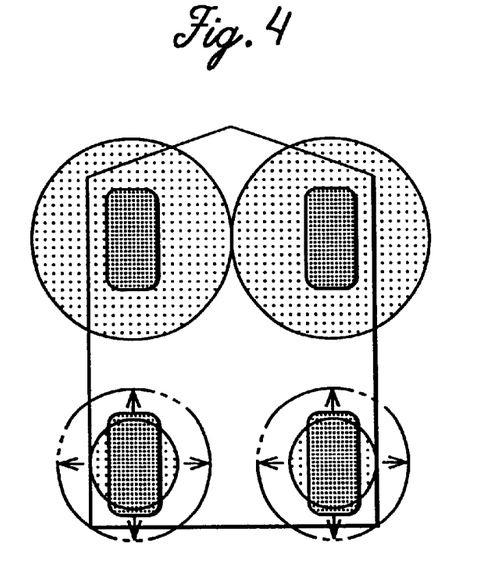
FIG. 4 illustrates a tire contact load distribution when a brake is applied in a vehicle incorporated with the system according to the present invention.

FIG. 4 schematically illustrates the distribution of the tire contact load (=gripping force) among the four wheels of the vehicle during braking. The static contact load is indicated by solid circles, and the dynamic contact load or the contact load produced by the stroke of the actuator 5 is indicated by the double chain dot line. In the example shown in FIG. 4, the contact load of the rear wheels is increased, but the actuator for each individual wheel can be individually controlled so that the actuator for any one of the wheels which is about to lock up may be actuated.

Figure 3:
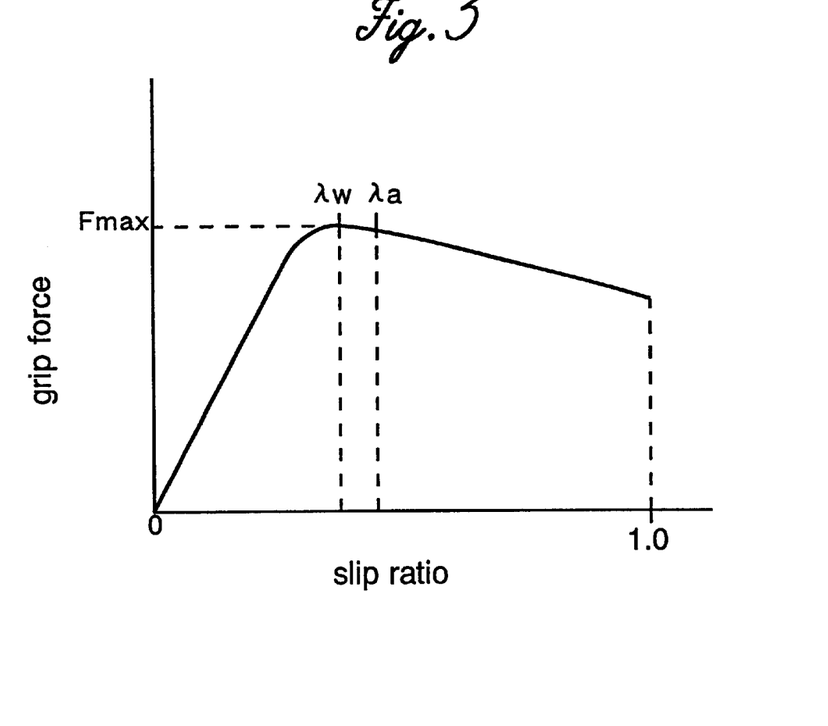
FIG. 3 is a graph showing the relationship between the slip ratio and the maximum available tire grip force.

In particular, it is preferable to set the threshold slip ratio $\lambda_w$ for initiating the contact load increase control lower than the threshold slip ratio $\lambda_a$ for initiating the antilock brake control of the ABS system (see FIG. 3). After the tire contact load has been increased by extending the actuator 5, it is necessary for the actuator 5 to retract before it becomes capable of increasing the tire contact load again. During this intermission, the slip ratio may increase again. In view of such a possibility, it is desirable to first apply a sufficient braking force by extending the actuator 5 to increase the tire contact load, and then to activate the ABS to prevent the wheel from locking up.

The above description was directed to the embodiment for increasing the fore-and-aft force available as the braking force by increasing the tire load, but it is obvious for a person skilled in the art that the same principle may be applied to increase the fore-and-aft force available as the traction force. The description given above can be readily modified into such an embodiment by interchanging the terms "braking" and "traction".

When the vehicle travels over an irregular road surface and the tires bounce repeatedly on the road surface, the contact load of each tire tends to be lower than normal. In other words, the relationship between the tire grip force F and the slip ratio $\lambda$ is somewhat different depending on the condition of the road surface. Normally, a sufficient braking force may not be obtained if the above described control is carried out when the vehicle is traveling over an irregular road surface by using a threshold slip ratio suitable for a smooth road surface. This problem can be eliminated as described in the following with reference to the flow chart of FIG. 5.

Figure 5:
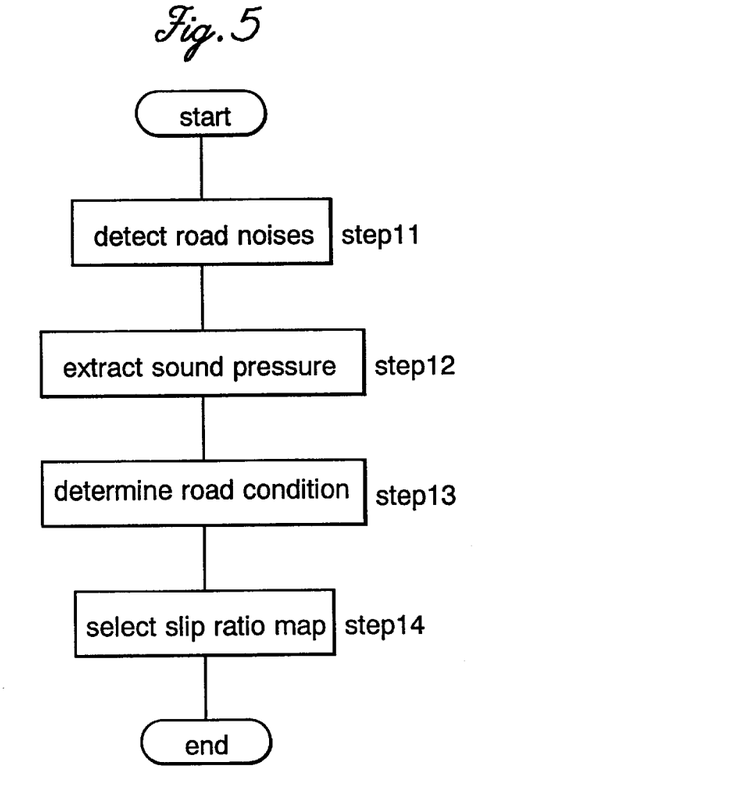
FIG. 5 is a flow chart showing an optional arrangement for taking into account the road condition in the contact load control system according to the present invention.
Figure 6:
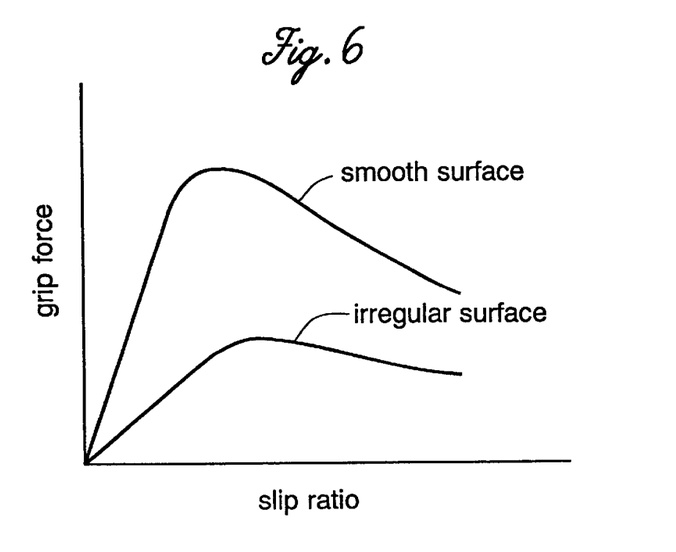
FIG. 6 shows how the relationship between the slip ratio and the maximum available tire grip force depend on the road condition.

First of all, road noises are picked up by using a microphone provided near one of the tires (step 11). The obtained noises are processed by a frequency analyzing circuit and a band pass filter to extract a sound pressure value of a certain frequency band (step 12). By looking up a database or a table map which defines the relationship between the sound pressure value, the vehicle speed and the road condition, the current road condition is determined (step 13). According to the result of this determination process, an optimum slip ratio map is selected from a plurality of F–λ maps (see FIG. 6) which are prepared in advance so as to cover a conceivable range of road conditions (step 14). By thus evaluating the tendency of each road wheel to lock up according to the obtained slip ratio, it is possible to carry out the tire contact load control at an optimum timing for each current road condition.

Figure 7:
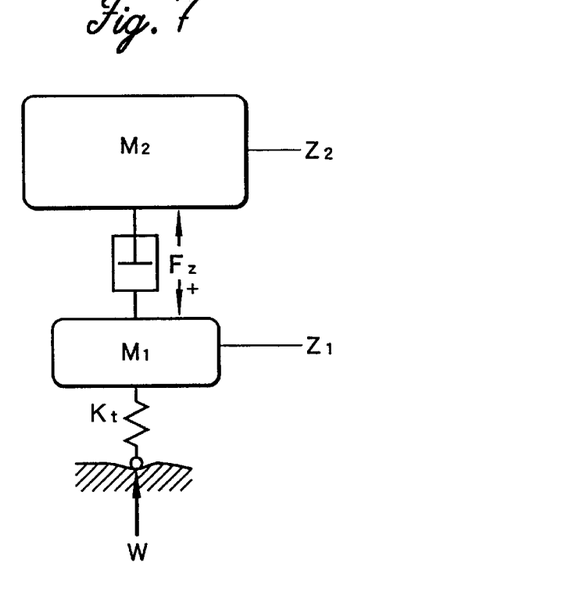
FIG. 7 is a diagram showing a mechanical model of the system shown in FIG. 1.

The working principle of this invention is described in the following with reference to FIG. 7 in which the following notations are used.

$M_2$: sprung mass
$M_1$: unsprung mass
$Z_2$: position of the sprung mass
$Z_1$: position of the unsprung mass
Kt: spring constant of the tire
Fz: thrust force of the actuator Suppose that the downward direction corresponds to a positive direction. Then, the equations of motion for the sprung mass $M_2$ and the unsprung mass $M_1$ are given as follows.

$$M_2 \cdot (d^2 Z_2/dt^2) = -Fz$$

$$M_1 \cdot (d^2 Z_1/dt^2) + Kt \cdot Z_1 = Fz$$

Therefore, the tire contact load W can be given by the following equation.

$$W = -Kt \cdot Z_1 = -Fz + M_1 \cdot (d^2 Z_1/dt^2)$$
$$= M_2 \cdot (d^2 Z_2/dt^2) + M_1 \cdot (d^2 Z_1/dt^2)$$

In other words, the tire contact load W can be given as a sum of the inertia forces of the sprung mass and the unsprung mass. Therefore the tire contact load W can be controlled by controlling the acceleration of extending and retracting the actuator, and thereby changing the inertia force of at least one of the sprung and unsprung masses. In particular, by controlling the individual actuator 5 for each of the wheels, it is possible to increase the contact load W of each tire at a desired timing. For instance, when the suspension stroke is 200 mm, and the actuator 5 can produce a thrust force of one ton or an acceleration of approximately 1 G, the maximum time duration of this inertia force will be approximately 0.2 seconds.

Figure 8:
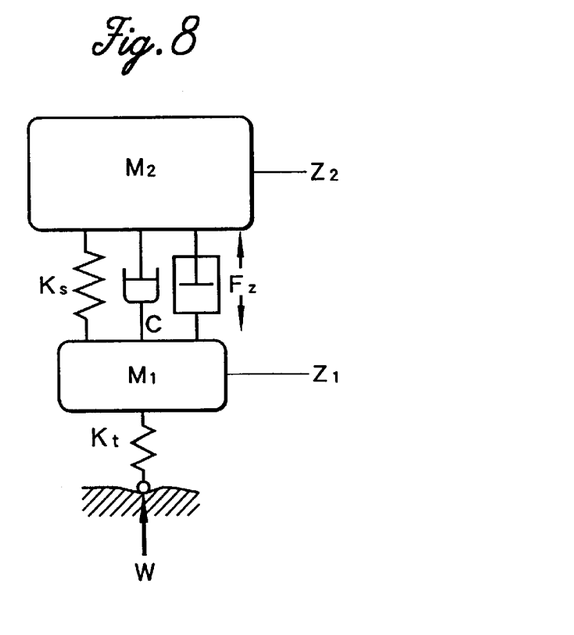
FIG. 8 is a diagram showing a mechanical model of a wheel suspension system incorporated with the system shown in FIG. 1.

Typically, with the aim of minimizing the energy consumption of each actuator, the proposed active wheel suspension system uses a suspension spring for supporting the weight of the vehicle body, and a damper for producing a damping force (see FIG. 8). In this case, if Ks is the spring constant of the suspension spring, and C is the damping coefficient of the damper, the equations of motion for the sprung mass $M_2$ and the unsprung mass $M_1$ are given as follows.

$$M_2 \cdot (d^2 Z_2/dt^2) + C \cdot (dZ_2/dt - dZ_1/dt) + Ks \cdot (Z_2 - Z_1) = -Fz$$

$$M_1 \cdot (d^2 Z_1/dt^2) + C \cdot (dZ_1/dt - dZ_2/dt) + Ks \cdot (Z_1 - Z_2) + Kt \cdot Z_1 = Fz$$

Therefore, the tire contact load W can be given by the following equation.

$$W = -Kt \cdot Z_1$$
$$= -Fz + M_1 \cdot (d^2 Z_1/dt^2) +$$
$$C \cdot (dZ_1/dt - dZ_2/dt) + Ks \cdot (Z_1 - Z_2)$$
$$= M_2 \cdot (d^2 Z_2/dt^2) + M_1 \cdot (d^2 Z_1/dt^2)$$

In other words, the tire contact load W can be likewise controlled by controlling the acceleration of extending and retracting the actuator.

Hydraulic cylinders were used for the actuators in the above described embodiment, but other actuators may also be used. Such actuators include, not exclusively, electric motors such as linear motors and moving coils, and mechanical arrangements such as cam mechanisms and spring members. Also, the various sensors may be simplified without departing from the spirit of the invention. For instance, the stroke sensor 21 may be omitted because a stroke can be computed by integrating the difference between the outputs from the acceleration sensors for the sprung mass and the unsprung mass 22 and 23. The load sensor 20 may also be omitted, because the output force of the actuator 5 may be computed from the actual values of the sprung mass and the unsprung mass, and the outputs from the acceleration sensors for the sprung mass and the unsprung mass 22 and 23. Also, the accelerations of the sprung mass and the unsprung mass may be indirectly computed from the outputs of the load sensor and the displacement sensor by defining a state estimating unit. The ECU 18 may consist of a digital computer, an analog computer or a hybrid computer.

Thus, according to the present invention, the limit of the grip force of each tire can be raised so that the locking of the tire can be avoided without reducing the braking force, and the braking distance can be significantly reduced. In other words, the tire is prevented from being lock up by increasing its contact load when the tire is about to lock up. Also, by detecting the road condition, for instance by analyzing the road noise, the threshold slip ratio for controlling the tire load control can be optimized for each particular road condition.

It is known that the vector sum of the lateral force and the fore-and-aft force of a tire is fixed or each given road condition so that the fore-and-aft force which is available as the traction force or the braking force is reduced when the lateral force is used for the turning motion of the vehicle. However, according to the present invention which allows the tire load to be increased, it is possible to improve the braking capability of a vehicle making a turn by increasing the tire load when the fore-and-aft force available for the braking force becomes inadequate.

Although the present invention has been described in terms of a preferred embodiment thereof, it is obvious to a person skilled in the art that various alterations and modifications are possible without departing from the scope of the present invention which is set forth in the appended claims.

What is claimed is:

1. A vehicle tire contact load control system, comprising:
a wheel suspension system for supporting an unsprung mass including a wheel to a sprung mass including a vehicle body;
an active actuator interposed between said unsprung mass and said sprung mass;

means for computing a slip ratio of a wheel; and a controller for extending said actuator at a prescribed acceleration so as to selectively apply an additional contact load to said wheel when a slip ratio computed by said computing means has exceeded a prescribed value.

2. A vehicle tire contact load control system according to claim 1, wherein said controller is adapted to apply said additional contact load to said wheel when a braking force is applied to said wheel, and said prescribed value consists of a value beyond which a braking force available to said wheel starts diminishing.

3. A vehicle tire contact load control system according to claim 2, wherein an antilock brake system is additionally provided in the vehicle, and said prescribed value is lower than a reference value at which said antilock brake system is activated.

4. A vehicle tire contact load control system according to claim 1, wherein said controller is adapted to apply said additional contact load to said wheel when a traction force is applied to said wheel, by the vehicle and said prescribed value consists of a value beyond which a traction force available to said wheel starts diminishing.

5. A vehicle tire contact load control system according to claim 1, further comprising means for determining a road condition, and said prescribed value is varied depending said road condition determined by said determining means.

6. A vehicle tire contact load control system according to claim 1, wherein said unsprung mass includes a plurality of wheels, said system includes a plurality of said active actuators, one said active actuator is interposed between said sprung mass and each said tire, and said controller independently extends each said actuator so that the contact load for each said wheel is increased at a desired timing.

7. A vehicle tire contact load control system according to claim 2, wherein said braking force is a fore-and-aft braking force.

* * * * *

UNITED STATES PATENT AND TRADEMARK OFFICE
CERTIFICATE OF CORRECTION

PATENT NO. : 6,223,108 B1
DATED : April 24, 2001
INVENTOR(S) : M. Izawa, K. Oshida, H. Shibue It is certified that error appears in the above-identified patent and that said Letters Patent is hereby corrected as shown below:

Column 6,
Line 39, change "being lock up" to -- being locked up --;
Line 46, change "or" to -- for --.

Column 8, claim 4,
Line 1, change "wheel, by the vehicle" to -- wheel by the vehicle, --;

Column 8, claim 5,
Line 6, after "depending" insert -- on --.

Signed and Sealed this

Twenty-seventh Day of November, 2001

Attest:

Nicholas P. Godici

NICHOLAS P. GODICI
*Attesting Officer*  *Acting Director of the United States Patent and Trademark Office*

UNITED STATES PATENT AND TRADEMARK OFFICE
CERTIFICATE OF CORRECTION

PATENT NO.    : 6,223,108 B1  
DATED         : April 24, 2001  
INVENTOR(S)   : M. Izawa, K. Oshida, H. Shibue It is certified that error appears in the above-identified patent and that said Letters Patent is hereby corrected as shown below:

Column 6,  
Line 39, change "being lock up" to -- being locked up --;  
Line 46, change "or" to -- for --.

Column 8,  
Line 1, change "wheel, by the vehicle" to -- wheel by the vehicle, --;

Column 8,  
Line 6, after "depending" insert -- on --.

This certificate supersedes Certificate of Correction issued November 27, 2001.

Signed and Sealed this

Twentieth Day of August, 2002

*Attest:*

JAMES E. ROGAN  
*Attesting Officer*    *Director of the United States Patent and Trademark Office*